United States Patent

Jackson et al.

(10) Patent No.: US 6,729,457 B2
(45) Date of Patent: *May 4, 2004

(54) SYNCHRONIZER

(75) Inventors: Graeme A. Jackson, Bolton (GB); Colin Duncan, Aberdeen (GB)

(73) Assignee: Eaton Corporaion, Cleveland, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/190,823

(22) Filed: Jul. 5, 2002

(65) Prior Publication Data

US 2003/0006116 A1 Jan. 9, 2003

(30) Foreign Application Priority Data

Jul. 7, 2001 (GB) .............................. 0116676

(51) Int. Cl.[7] .............................. F16D 23/06
(52) U.S. Cl. .................. 192/53.31; 192/53.341
(58) Field of Search ................... 192/53.31, 53.34, 192/53.341, 53.342, 48.91; 74/339

(56) References Cited

U.S. PATENT DOCUMENTS

| | | | | | |
|---|---|---|---|---|---|
| 2,547,732 | A | * | 4/1951 | Baker | 192/48.91 |
| 4,817,772 | A | * | 4/1989 | Sacher | 192/48.91 |
| 4,869,353 | A | * | 9/1989 | Ohtsuki et al. | 192/53.31 |
| 5,425,437 | A | * | 6/1995 | Nellums | 192/53.3 |
| 5,507,376 | A | * | 4/1996 | Skotnicki | 192/48.91 |
| 5,588,516 | A | * | 12/1996 | Braun et al. | 192/48.91 |
| 5,713,447 | A | * | 2/1998 | Skotnicki et al. | 192/53.31 |
| 5,738,194 | A | * | 4/1998 | Hughes | 74/339 |
| 5,957,257 | A | * | 9/1999 | Nellums | 192/53.31 |
| 6,443,281 | B2 | * | 9/2002 | Jackson et al. | 192/53.31 |
| 6,467,597 | B1 | * | 10/2002 | Fernandez | 192/53.31 |

FOREIGN PATENT DOCUMENTS

| | | | | |
|---|---|---|---|---|
| EP | 0663541 | | 7/1995 | F16D/23/06 |
| EP | 0897069 | | 2/1999 | F16D/23/06 |
| GB | 2337125 | | 6/2001 | F16D/23/06 |

* cited by examiner

*Primary Examiner*—Rodney H. Bonck
(74) *Attorney, Agent, or Firm*—Paul S. Rulon; Kevin N. Hinman; Geoffrey H. Clarke

(57) ABSTRACT

A double acting synchronizer (18) includes cone clutch friction surfaces (24,40*a* and 26,42*a*) and jaw clutch teeth (28,38*b* and 30,38*c*) for frictionally synchronizing and positively connecting gears (14,16) to a shaft (12), and a plurality of integrated self-energizing/pre-energizing/blocker assemblies (44).

21 Claims, 2 Drawing Sheets

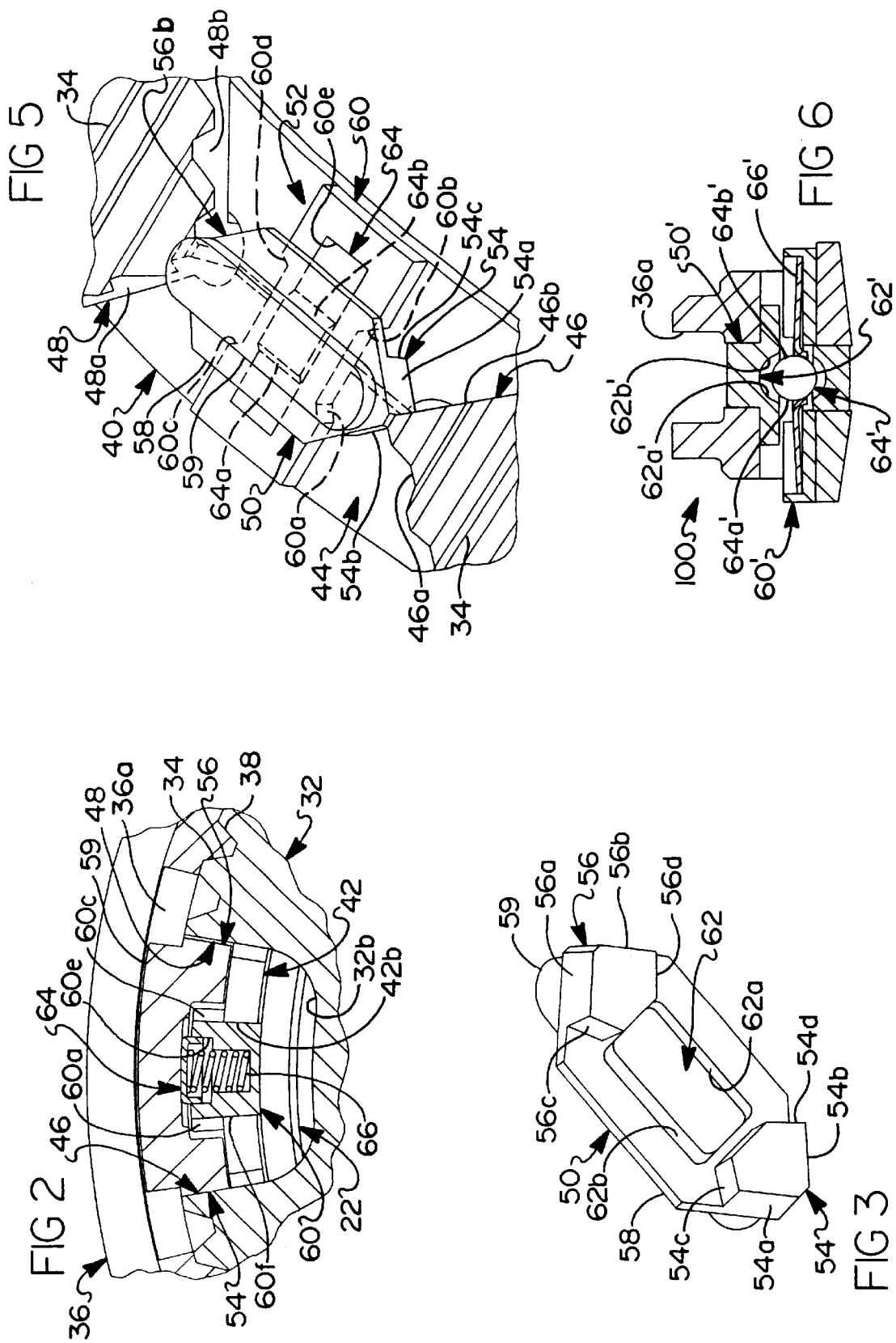

SYNCHRONIZER

FIELD OF THE INVENTION

This invention relates to a pre-energizer for a synchronizer.

BACKGROUND OF THE INVENTION

Synchronizers for use in multi-ratio transmissions are well known. Such synchronizers may be of the single or double acting type and include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulking means having blocker teeth for arresting engaging movement of the shift sleeve until synchronization is reached and for transferring a shift force from the sleeve to increase the engaging force of the friction members.

It is also known that such synchronizers may be used to reduce shift time and shift effort required by a vehicle operator by the providing the synchronizes with self-energizing. EP-A-0663 541 discloses a synchronizer having all of the above.

SUMMARY OF THE INVENTION

An object of this invention is to provide a synchronizer with an improved pre-energizer.

The invention relates to a synchronizer for first and second drives disposed for relative rotation about a common axis, as disclosed in EP-A-0 663 541 which represents the precharacterizing part of claim. 1. The synchronizer comprises: A first element is affixed against rotation and axial movement relative to the first drive. A second element includes connecting means allowing sliding and non-rotational movement the second element relative to the first element, and includes first jaw means axially movable from a neutral position to an engaged position with second jaw means for positively connecting the drives in response to engaging movement of the second element by an axially directed first shift force; First friction means are axially movable into engagement with second friction means for synchronizing the first and second jaw means in response to the engaging movement of the second element. First and second blocker means are operative when engaged to prevent engagement of the first and second jaw means prior to the synchronizing. Pre-energizing means are for engaging the first and second friction means with an initial engaging force in response to initial engaging movement of the second element by the first shift force from the neutral position and for engaging the first and second blocker means in response to the initial engagement of the first and second friction means producing a synchronizing torque. First and second self-energizing means are operative when engaged to react the synchronizing torque for producing a first additive axial force in the direction of the first shift force and for increasing the engagement force of the first and second friction means. One of the first and second self-energizing means includes means for directing the first additive axial force to the first friction means via the first and second blocker means. The first self-energizing means is mounted on one of the elements and the second self-energizing means is mounted for non-radial movement and limited rotation relative to another of the elements.

The improvement is characterized by the pre-energizing means including first ramp means biased by resilient means toward engagement with second ramp means affixed to the second self-energizing means for transmitting the first shift force to the first friction means via the second self-energizing means and the first and second ramp means in response to the initial engaging movement of the second element.

BRIEF DESCRIPTION OF THE DRAWINGS

The synchronizer of the invention is shown in the accompanying drawings in which:

FIG. 2 is a sectional view of a portion of the synchronizer looking along line 2—2 in FIG. 1;

FIG. 3 is a perspective view of a component in FIGS. 1 and 2;

FIG. 5 is a perspective view of a pre-energizing, self-energizing and blocker assembly of the synchronizer, and FIG. 6 is a sectional view of a second embodiment of the pre-energizing, self-energizing and blocker assemblies.

DETAILED DESCRIPTION OF THE DRAWINGS

The term "synchronizer" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "pre-energizer" shall designate mechanism for effecting initial engagement of the friction clutch in response to initial attempted engagement of the positive clutch. The term "self-energizing" shall designate mechanism to increase the engaging force of the synchronizing friction clutch in proportion to the synchronizing torque of the friction clutch.

Figure 1:
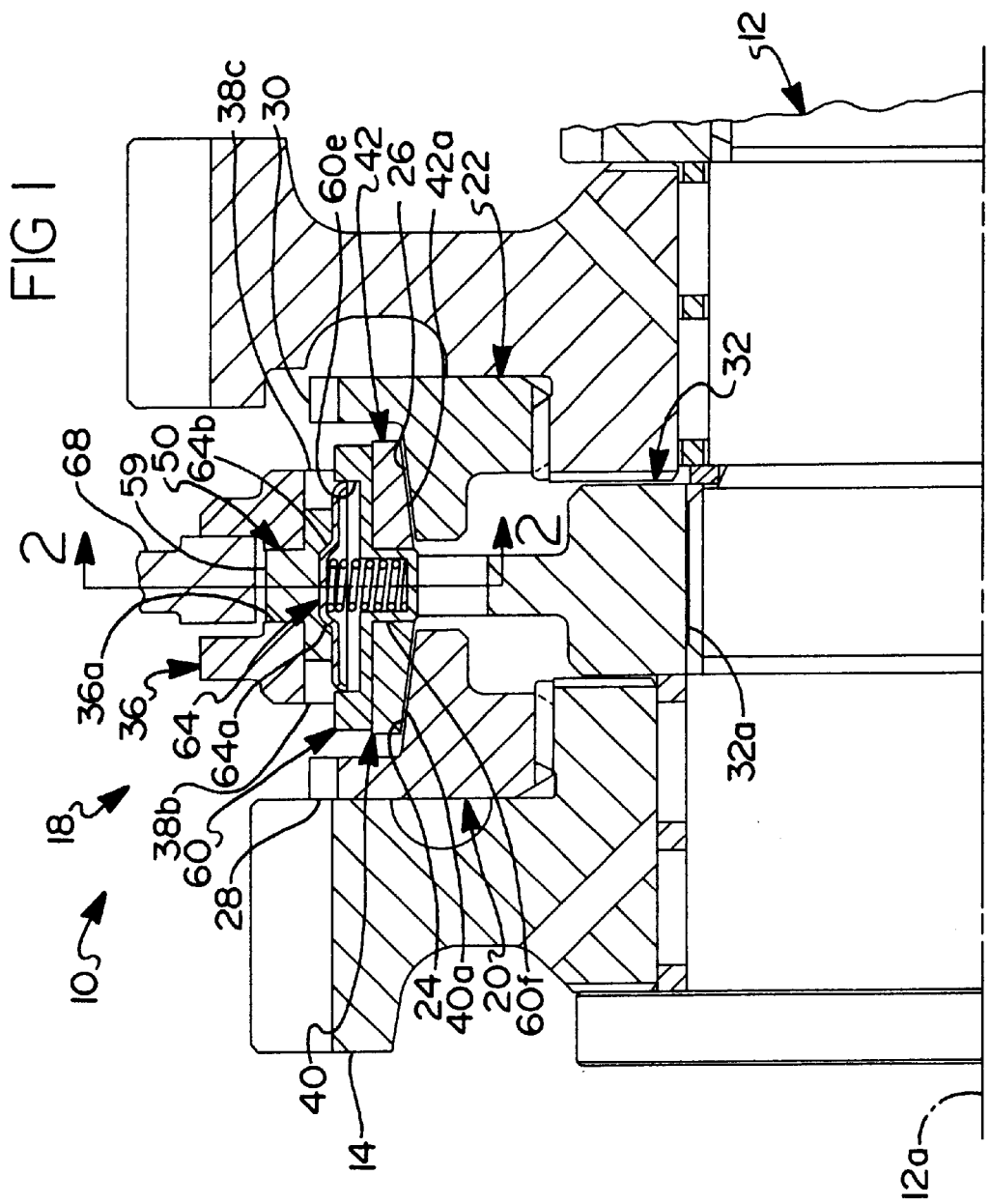
FIG. 1 is a sectional view of an upper half of a double-acting synchronizer in a neutral position and disposed for rotation about the axis of a shaft.
Figure 4:
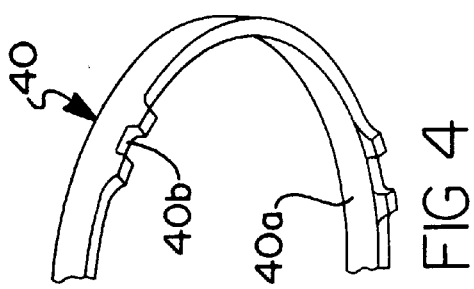
FIG. 4 is a reduced size, perspective view of a portion of a friction ring in the synchronizer.

Looking now at FIGS. 1–4, therein is shown a gear and synchronizer assembly which forms part of a multi-ratio change speed transmission. Assembly 10 includes a shaft or drive 12 mounted for rotation about a central axis 12a, axially spaced apart gears 14,16 supported on the shaft for rotation relative thereto and secured against axial movement relative to the shaft in known manner, and a double-acting synchronizer 18 for coupling either gear to the shaft. The synchronizer may be of the single-acting type for coupling only one of the gears the shaft.

The synchronizer 18 includes annular members 20,22 axially and rotatably affixed to gears 14,16 in known manner, gear cone shaped friction surfaces 24,26 and gear jaw teeth 28,30 herein integral with members 20,22, a hub member or element 32 axially and rotatably affixed at a central opening 32a thereof to shaft 12 and having external splines 34, a shift sleeve or element 36 having connecting means in the form of internal splines 38 in axial sliding mesh with the external splines 34 and friction rings 40,42. The synchronizer further includes three circumferentially spaced apart and integrated self-energizing, pre-energizing and blocker assemblies 44 each disposed in a hub recess 32b having circumferentially spaced apart ends 46,48 defining self-energizing or boost ramp surfaces 46a, 46b and 48a, 48b. Each friction ring includes a cone friction surface 40a,42a and three circumferentially spaced apart recesses 40b,42b. Recesses 40b,42b react with portions of assemblies 44 to transmit operator shift force $F_o$, pre-energizing forces, and self-energizing forces $F_a$ to the friction surfaces.

Each assembly 44 includes a self-energizing member 50 which also functions as a combination pre-energizing and blocker assembly 52. Each member 50 includes circumferentially spaced apart end portions 54,56 rigidly secured together by a flange 58 having a circumferentially extending portion 59 received in a circumferentially extending slot 36a in shift sleeve 36. Slot 36a allows limited circumferential movement of member 50 relative to the shift sleeve and hub and prevents axial movement relative to the shift sleeve. End portions 54,56 respectively include self-energizing or boost ramp surfaces 54a,54b and 56a,56b that respectively react against the self-energizing ramp surfaces 46a,46b and 48a, 48b during self-energizing operation. End portions 54,56 also include blocker ramp surfaces 54c,54d and 56c,56d that react against blocker ramp surfaces 60a,60b and 60c,60d defined by a necked down portion of a force transferring strut like member 60 of assembly 52 during synchronizing and self-energizing operation. The radially inwardly facing side of flange portion 58 includes an elongated recess or detent 62 having angled pre-energizing ramps 62a,62b that react against pre-energizing ramps 64a,64b defined by a raised portion of an elongated ramp member 64 disposed in a mating recess 60e of member 60 and biased radially outward by a resilient means such as a coil spring 66. The radially inwardly facing side of member 60 includes a inwardly extending portion 60f having an internal recess receiving one end of spring 66 and a rectangular exterior received in the friction ring recesses 40b,42b. Recesses 40b,42b, which are open at their axially facing sides, allow axial movement of the strut member 60 relative to the friction rings 40,42. The pre-energizing ramps and spring 66 resiliently positions shift sleeve 36 in the neutral position of FIGS. 1,2 and 5.

As is readily seen, friction surfaces 24,40a and 26,42a pair up to define friction clutches for synchronizing the gears to the shaft prior to engagement of the jaw clutch members. Cone friction clutches are disclosed herein; however, other types of friction clutches may be used. The friction surfaces may be defined by any of several known friction materials, e.g., pyrolytic carbon friction materials such as disclosed in U.S. Pat. Nos. 4,700,823; 4,844,218 and 4,778,548 may be used.

As previously mentioned spline teeth 34,38 have axially extending flank surfaces which continuously mate in close sliding relation so that there is relatively no free play between shift sleeve 36 and shaft 12. Opposite ends of internal splines 38 define jaw teeth 38b,38c which respectively mate with gear teeth 28,30 to positive clutch the gears to the shaft. The flank sides of jaw teeth 38b,38c and of gear jaw teeth 28,30 may be provided with an anti-back out or a locking angle feature to prevent inadvertent disengagement of the teeth and with angled axially facing ends to assist engagement. These features may be seen by reference to U.S. Pat. No. 4,727,968.

When it is desired to couple either gear to the shaft, an appropriate and unshown shift mechanism, such as disclosed in U.S. Pat. No. 4,920,815, moves shift sleeve 36 axially via a partially shown shift fork 68 along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, pre-energizer assemblies apply a pre-energizer force proportional to the force applied by the operator to the shift sleeve. Whether manually or automatically applied, the force is applied to the shift sleeve in an axial direction and is proportional to a shift force hereinafter referred to as an operator shift force $F_O$. The pre-energizer force, depending on direction of shift sleeve movement by the shift force $F_O$, moves either friction surface 40a or 42a into initial engagement with its associated friction surface to clock the strut member 60 to a position relative to hub 32 for positioning the self-energizing member 50 and the blocker ramp surfaces thereof for engagement with the blocker ramp surfaces of strut member 60 in a manner explained hereinafter.

The pre-energizing, blocking and self-energizing force paths and component engagements for synchronizing shaft 12 with gear 16 assumes an asynchronous condition in one direction exists between shaft 12 and gear 16. Asynchronous conditions in the other direction or for synchronizing gear 14 produce force paths and component engagements that should be obvious from the following description. Initial rightward axial engaging movement of shift sleeve 36 by the operator shift force is transmitted to friction ring 42 via a force path including shift sleeve 36, self-energizing members 50, pre-energizing ramps 62a,64a, spring biased members 64, strut members 60, and radially inwardly extending portions 60f of the strut members which contact circumferentially extending portions of recesses 42b. This initial engaging movement and force moves friction surface 42a into friction surface 26, thereby producing an initial synchronizing torque for rotating friction ring 42 and strut members 60 to positions ensuring contact of blocker ramp surfaces 60b with blocker ramp surface 54c. This initial axial movement of the shift sleeve also allows the torque from friction ring 42 to rotate strut member 60 and self-energizing member 50 counterclockwise relative to hub 32 for engaging self-energizing ramp surfaces 54b,46b via force path that includes friction ring 42, strut members 60, self-energizing member end portions 54 and self-energizing ramp surfaces 54b,46b. This force path does not include the pre-energizing ramps and accordingly is independent of the pre-energizing forces.

When self-energizing ramp surfaces 54b,46b and blocker ramp surfaces 54c,60b are engaged and ignoring the effect of engaged self-energizing ramp surfaces 54b,46b, full operator shift force $F_O$ is applied to friction rind 42 via a force path that includes shift sleeve 36, self-energizing member blocker ramp surfaces 54c, and blocker ramp surfaces 60b and inwardly extending portions 60f of the strut member, thereby engaging friction surfaces 42a,26 with full operator shift force for producing a synchronizing torque proportional to the operator shift force $F_O$. Since blocker ramp surfaces 54c,60b are oblique to the plane of rotation they, in addition to preventing asynchronous engagement of jaw teeth 38b,30 and transmitting the shift force Fo to friction surfaces 42a,26, also produce a counter torque or unblocking torque counter to the synchronizing torque but of lesser magnitude during asynchronous conditions. When substantial synchronism is reached the synchronizing torque drops below the unblocking torque, whereby the blocker ramp surfaces move out of engagement to allow continued axial movement of the shift sleeve and engagement of moveable jaw teeth 38c with gear jaw teeth 30.

Looking now at the affects of the self-energizing ramp surfaces, the synchronizing torque $T_O$, due to the operator applied axial shift force $F_O$, is, of course, reacted across the self-energizing ramp surfaces, which surfaces produce an axial force component or axial additive force $F_a$ acting in the same direction as operator shift force $F_O$. This additive force $F_a$ is also transmitted across the blocker ramp surfaces, thereby further increasing the engaging force of the friction surfaces to provide an additive synchronizing torque $T_a$ which adds to the torque $T_O$. The synchronizer may include means to limit the magnitude of the additive axial force $F_a$. One such means is shown in an as of yet unpublished European Patent Application 00 125 950.0.

Looking now at the synchronizer embodiment of FIG. 6, therein is shown a pre-energizing, blocking and self-energizing assembly 100 that differs from assembly 44 only with respect to the pre-energizing structure. A prime is added to modified portions of the structure. Assembly 100 employs a leaf spring 66' in lieu of coil spring 66 and a convex member in the form of a ball or roller 64' (herein a ball) that reacts against a mating concave detent 62' formed in a self-energizing member 50' that differs from member 50 only in this respect. Leaf spring 66' is disposed in a force transmitting member 60' in a manner analogous to elongated member 64 in strut member 60. Detent 62' and ball 64' define pre-energizing ramps 62a',62b' and 64a',64b' that operate the same as pre-energizing ramps 62a,62b and 64a,64b.

A synchronizer with two pre-energizing, blocking and self-energizing assemblies are disclosed. The following claims are intended to cover inventive portions of the assemblies.

What is claimed is:

1. A synchronizer for first and second drives disposed for relative rotation about a common axis; the synchronizer comprising:
   a first element affixed against rotation and axial movement relative to the first drive;
   a second element including connecting means allowing sliding and non-rotational movement of the second element relative to the first element, and including first jaw means axially movable from a neutral position to an engaged position with second jaw means for positive connecting the drives in response to engaging movement of the second element by an axially directed first shift force;
   first friction means axially movable into engagement with second friction means for synchronizing the first and second jaw means in response to the engaging movement of the second element;
   first and second blocker means operative when engaged to prevent engagement of the first and second jaw means prior to the synchronizing;
   pre-energizing means for engaging the first and second friction means with an initial engaging force in response to initial engaging movement of the second element by the first shift force from the neutral position and for engaging the first and second blocker means in response to the initial engagement of the first and second friction means producing a synchronizing torque;
   first and second self-energizing means operative when engaged to react the synchronizing torque for producing a first additive axial force in the direction of the first shift force and for increasing the engagement force of the first and second friction means, one of the first and second self-energizing means including means for directing the first additive axial force to the first friction means via the first and second blocker means, the first self-energizing means mounted on one of the elements and the second self-energizing means mounted for non-radial movement and limited rotation relative to another; characterized by:
   the pre-energizing means including first ramp means biased by resilient means toward engagement with second ramp means affixed to the second self-energizing means for transmitting the first shift force to the first friction means via the second self-energizing means in response to the initial engaging movement of the second element.

2. The synchronizer of claim 1, wherein:
   the first friction means includes a cone shaped ring having a recess; and
   a strut member having a radially inwardly extending portion disposed in the recess for transmitting the first shift force and the first additive axial force to the first friction means.

3. The synchronizer of claim 2, wherein:
   the first cone shaped ring has a radially outer surface supporting the strut member.

4. The synchronizer of claim 2, wherein:
   the first ramp means is defined by a ramp member supported by the strut member for axial and circumferential movement therewith and biased radially outward of the strut member by the resilient means; and
   the second ramp means defined by a radially inwardly facing portion of the second self-energizing means.

5. The synchronizer of claims 4, wherein:
   the resilient means comprises a coil spring reacting radially between the strut member and the ramp member means.

6. The synchronizer of claim 5, wherein:
   the first element is a hub;
   the second element is a shift sleeve:
      the one of the first and second self-energizing means is the second self-energizing means:
         the first self-energizing means is affixed to the hub; and
         the second self-energizing means is mounted on the shift sleeve.

7. The synchronizer of claims 2, wherein:
   the resilient means comprises a coil spring reacting radially between the strut member and the ramp member means.

8. The synchronizer of claim 2, wherein:
   the resilient means is defined by a leaf spring supported by the strut member for axial and circumferential movement therewith; and
   a convex detent member is supported by the leaf spring for axial and circumferential movement therewith and defines the first ramp means biased radially outward by the leaf spring toward the engagement with the second ramp means defined by a concave detent in a radially inwardly facing portion of the second self-energizing means.

9. The synchronizer of claim 1, further for a third drive disposed for rotation about the common axis relative to the first and second drives and axially spaced from the second drive;
   the second element connecting means defining third jaw means axially movable from a neutral position to an engaged position with fourth jaw means for positive connecting the first and third drives in response to engaging movement of the second element by an axially directed second shift force;

third friction means axially movable into engagement with fourth friction means for synchronizing the third and fourth jaw means in response to the engaging movement of the second element y the second shift force;

third and fourth blocker means operative when engaged to prevent engagement of the third and fourth jaw means prior to the synchronizing;

the pre-energizing means for engaging the third and fourth friction means with an initial engaging force in response to initial engaging movement of the second element by the second shift force from the neutral position and for engaging the third and fourth blocker means in response to the initial engagement of the third and fourth friction means producing a synchronizing torque;

the first and second self-energizing means operative when engaged to react the synchronizing torque for producing a second additive axial force in the direction of the second shift force and for increasing the engagement force of the third and fourth friction means, the means of the one of the first and second self-energizing means directing the second additive axial force to the third friction means via the third and fourth blocker means;

the pre-energizing means including third ramp means biased by the resilient means toward engagement with fourth ramp means affixed to the second self-energizing means for transmitting the second shift force to the third friction means via the second self-energizing means in response to the initial engaging movement of the second element by the second shift force.

10. The synchronizer of claim 9, wherein:

the first friction means includes a cone shaped ring having a recess; and a strut member having a radially inwardly extending portion disposed in the recess for transmitting the first shift force and the first additive axial force to the first friction means; and the third friction means includes a cone shaped ring having a recess receiving the radially inwardly extending portion for transmitting the second shift force and the second additive axial force to the second friction means.

11. The synchronizer of claim 10, wherein:

the first and second cone shaped rings have radially outer surfaces supporting the strut member.

12. The synchronizer of claim 10, wherein:

the first ramp means is defined by a ramp member supported by the strut member for axial and circumferential movement therewith and biased radially outward of the strut member by the resilient means;

the second ramp means defined by a radially inwardly facing portion of the second self-energizing means;

the third ramp means is defined by a ramp member supported by the strut member for axial and circumferential movement therewith and biased radially outward of the strut member by the resilient means; and the fourth ramp means defined by a radially inwardly facing portion of the second self-energizing means.

13. The synchronizer of claims 12, wherein:

the resilient means comprises a coil spring reacting radially between the strut member and the ramp member means.

14. The synchronizer of claim 12, wherein:

the first element is a hub;

the second element is a shift sleeve:

the one of the first and second self-energizing means is the second self-energizing means:

the first self-energizing means is affixed to the hub; and the second self-energizing means is mounted on the shift sleeve.

15. The synchronizer of claims 10, wherein:

the resilient means comprises a coil spring reacting radially between the strut member and the ramp member means.

16. The synchronizer of claim 10, wherein:

the resilient means is defined by a leaf spring supported by the strut member for axial and circumferential movement therewith; and a convex detent member is supported by the leaf spring for axial and circumferential movement therewith and defines the first ramp means biased radially outward by the leaf spring toward the engagement with the second ramp means defined by a concave detent in a radially inwardly facing portion of the second self-energizing means.

17. The synchronizer of claim 16, wherein:

the third and fourth ramp means are defined by the convex detent member and the concave detent, respectively.

18. The synchronizer of claim 10, wherein:

the recesses include axially facing ends allowing axial movement of the strut member relative to one of the first and third friction means when the other of the first and third friction means is moving into engagement.

19. A synchronizer for first and second drives disposed for relative rotation about a third drive having an axis; the synchronizer comprising:

a hub affixed against rotation and axial movement relative to the third drive;

a shift sleeve including connecting means allowing sliding and non-rotational movement of the sleeve relative to the hub, and including first and second jaw means axially movable respectively from a neutral position to an engaged position with third and fourth jaw means for positively connecting either of the first and second drives to the third drive in response to engaging movement of the sleeve by an axially directed first and second shift forces, respectively;

first and second friction rings axially movable respectively into engagement with third and fourth friction surfaces for synchronizing the first and second jaw means respectively with the third and fourth jaw means in response to the engaging movement of the sleeve;

first and second blockers respectively engagable with third and fourth blockers to prevent the engaged position of the first and second jaw means prior to the synchronizing;

pre-energizing means for effecting initial engagement of the first and second friction rings respectively with the third and fourth friction surfaces in response to initial engaging movement of the sleeve by the first and second shift forces respectively from the neutral position and for respectively engaging the first and third blockers and the second and fourth in response to the initial engagement of the first and second friction rings producing a synchronizing torque, the pre-energizing means including a detent axially movable with the sleeve, a ramp member, and resilient means biasing the ramp member radially outward toward the detent; characterized by:

the pre-energizing means including a strut member supported on the first and second friction rings, the strut member having a radially inwardly extending portion disposed in first and second recesses in the first and second friction rings, respectively, and having the third and fourth blockers affixed thereto, a ramp member supported by the strut member for axial and circumferential movement therewith, and the resilient means reacting between the strut and ramp members.

20. The synchronizer of claim 19, wherein:

the detent is defined by a self-energizing member mounted for limited rotation relative to the sleeve, the self-energizing member having first and second self-energizing surfaces respectively engagable with third and fourth self-energizing surfaces and having the first and second blockers affixed thereto.

21. The synchronizer of claim 20, wherein:

the recesses include axially facing ends allowing axial movement of the strut member relative to one of the first and third friction means when the other of the first and third friction means is moving into engagement.

* * * * *